(12) United States Patent
Lee et al.

(10) Patent No.: US 12,443,089 B2
(45) Date of Patent: Oct. 14, 2025

(54) OPTICAL PATH CONTROL DEVICE AND DISPLAY DEVICE INCLUDING THE SAME

(71) Applicant: LG Display Co., Ltd., Seoul (KR)

(72) Inventors: Sanghyun Lee, Paju-si (KR); Minsu Park, Paju-si (KR); Chiyong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 539 days.

(21) Appl. No.: 17/902,554

(22) Filed: Sep. 2, 2022

(65) Prior Publication Data
US 2023/0205041 A1 Jun. 29, 2023

(30) Foreign Application Priority Data

Dec. 28, 2021 (KR) .......................... 10-2021-0189140

(51) Int. Cl.
*G02F 1/17* (2019.01)
(52) U.S. Cl.
CPC .................................. *G02F 1/172* (2013.01)
(58) Field of Classification Search
CPC ........ G02F 1/172; G02F 1/1323; G02F 1/167; G02F 1/1676; G02F 1/1685; G02F 1/1335; G02B 26/004
See application file for complete search history.

(56) References Cited

U.S. PATENT DOCUMENTS

| | | | | |
|---|---|---|---|---|
| 8,154,790 | B2* | 4/2012 | Wang | G02F 1/167 |
| | | | | 345/107 |
| 8,427,737 | B2* | 4/2013 | Yoshida | G02F 1/167 |
| | | | | 345/107 |
| 10,120,184 | B1* | 11/2018 | Langendijk | G02B 26/005 |
| 11,099,453 | B1 | 8/2021 | Massard et al. | |
| 2010/0103501 | A1 | 4/2010 | Wang et al. | |
| 2010/0259813 | A1 | 10/2010 | Kawase et al. | |
| 2012/0019896 | A1 | 1/2012 | Yoshida et al. | |
| 2012/0154898 | A1 | 6/2012 | Kwon et al. | |

FOREIGN PATENT DOCUMENTS

| | | |
|---|---|---|
| CN | 106909011 A | 6/2017 |
| JP | 2004-77876 A | 3/2004 |
| KR | 10-2020-0012683 A | 2/2020 |
| KR | 10-2021-0043155 A | 4/2021 |

* cited by examiner

*Primary Examiner* — Tuyen Tra
(74) *Attorney, Agent, or Firm* — Birch, Stewart, Kolasch & Birch, LLP

(57) ABSTRACT

An optical path control device and a display device including the same are discussed. The optical path control device can include a first substrate, a first electrode disposed on the first substrate, a second electrode disposed on the first substrate, a second electrode disposed under the second substrate, and a photoconversion layer disposed between the first electrode and the second electrode. The photoconversion layer can include a partition portion and a receiving portion that are alternately arranged, and the receiving portion can include suspended particles. The first electrode can include a first auxiliary electrode disposed on a first area of the first substrate and a second auxiliary electrode disposed on a second area of the first substrate.

16 Claims, 11 Drawing Sheets

OPTICAL PATH CONTROL DEVICE AND DISPLAY DEVICE INCLUDING THE SAME

CROSS-REFERENCE TO RELATED APPLICATION

The present application claims priority to Korean Patent Application No. 10-2021-0189140, filed on Dec. 28, 2021 in the Republic of Korea, the entire contents of which are incorporated by reference into the present application.

BACKGROUND

Field of the Invention

The present disclosure relates to an optical path control device and a display device including the same.

Description of the Related Art

A light-shielding film can function as an optical path control device that blocks light in a particular direction and passes light in another specific direction therethrough by controlling a moving path of light based on an incidence angle of external light. The light-shielding film can be attached to a display device such as a cellular phone, a laptop computer, a tablet personal computer (PC), a vehicle navigation system, etc., to adjust a wide viewing angle when an image is output or to implement a clear display quality within a particular viewing angle.

Recently, a switchable light-shielding film capable of turning on/off a viewing angle control mode according to a user environment has been developed. The switchable light-shielding film can block or open an optical path through dispersion and condensation of particles by controlling electrical behavior particles dispersed in a solvent according to an electric field formed therein. By using the switchable light-shielding film, a private mode and a share mode of the display device can be implemented.

As an operating time of the switchable light-shielding film increases, electric field deviation can occur between regions due to penetration of an external sealant and/or temperature deviation during operation, etc., which can result in inappropriate control of the particle behavior. For example, when the strength of the electric field decreases in an edge region, the particles can be concentrated in a central region, which can degrade luminance in the edge region in the share mode.

SUMMARY OF THE DISCLOSURE

Embodiments of the present disclosure provide an optical path control device that uniformly controls a particle behavior in the entire region by using a patterned electrode, and a display device including the optical path control device.

Embodiments of the present disclosure also provide an optical path control device that solves or addresses electric field deviation by applying different voltages to a first region and a second region through a first electrode disposed in the first region and a second electrode disposed in the second region, and a display device including the optical path control device.

Embodiments of the present disclosure provide an optical path control device that minimizes electrical stress applied to particles by periodically changing a voltage applied to an electrode, and a display device including the optical path control device.

An optical path control device according to an embodiment of the present disclosure includes a first substrate, a first electrode disposed on the first substrate, a second substrate disposed on the first substrate, a second electrode disposed under the second substrate, and a photoconversion layer disposed between the first electrode and the second electrode in which a partition portion and a receiving portion including suspended particles are alternately arranged. The first electrode can include a first auxiliary electrode disposed on a first area of the first substrate and a second auxiliary electrode disposed on a second area of the first substrate.

The first area can be a central area of the first substrate, and the second area can be at least a part of an edge area of the first substrate.

The first auxiliary electrode can include a plurality of first extension portions spaced apart from each other in the central area to extend in a first direction and a first connection portion connecting the first extension portions, and the second auxiliary electrode can include a plurality of second extension portions spaced apart from each other in the edge area to extend in the first direction and a second connection portion connecting the second extension portions.

The receiving portion can be disposed so that a central area thereof overlaps the plurality of first extension portions and both ends thereof overlap the plurality of second extension portions.

A voltage may not be applied to the first electrode and the second electrode in a private mode and a voltage can be applied to the first electrode and the second electrode in a share mode, in which voltages of different levels are applied to the first auxiliary electrode and the second auxiliary electrode.

A pulse voltage in which a holding voltage and an idle voltage are alternated every preset pulse width can be applied to the first electrode during the share mode.

The pulse voltage can be set to alternate a first holding voltage and a first idle voltage during a first period of the share mode, and to alternate a second holding voltage that is different from the first holding voltage and a second idle voltage that is different from the first idle voltage during a second period of the share mode.

In the receiving portion, a width of one end contacting the first electrode can be different from a width of the other end contacting the second electrode.

The suspended particles can be agglomerated in a direction where the width is wide in the receiving portion, by an electric field formed when a voltage is applied to the first electrode and the second electrode.

A display device according to an embodiment of the present disclosure includes a display panel including pixels arranged therein and configured to display an image, a gate driver configured to apply a gate signal to the pixels, a data driver configured to apply a data signal to the pixels in synchronization with the gate signal, a controller configured to control the gate driver and the data driver to display the image on the display panel, and an optical path control device configured to control a path of light emitted from the display panel according to an operation mode. The optical path control device can include a first substrate, a first electrode disposed on the first substrate, a second electrode disposed on the first substrate, a second electrode disposed under the second substrate, and a photoconversion layer disposed between the first electrode and the second electrode in which a partition portion and a receiving portion including suspended particles are alternately arranged. The first electrode can include a first auxiliary electrode disposed on a first area of the first substrate and a second auxiliary electrode disposed on a second area of the first substrate.

The first area can be a central area of the first substrate, and the second area can be at least a part of an edge area of the first substrate.

The first auxiliary electrode can include a plurality of first extension portions spaced apart from each other in the central area to extend in a first direction and a first connection portion connecting the first extension portions, and the second auxiliary electrode can include a plurality of second extension portions spaced apart from each other in the edge area to extend in the first direction and a second connection portion connecting the second extension portions.

The receiving portion can be disposed so that a central area thereof overlaps the plurality of first extension portions and both ends thereof overlap the plurality of second extension portions.

The controller may not apply a voltage to the first electrode and the second electrode in a private mode and can apply a voltage to the first electrode and the second electrode in a share mode, in which the controller applies voltages of different levels to the first auxiliary electrode and the second auxiliary electrode.

The controller can apply to the first electrode, a pulse voltage in which a holding voltage and an idle voltage are alternated every preset pulse width during the share mode.

The controller can apply to the first electrode, a first pulse voltage in which a first holding voltage and a first idle voltage are alternated during a first period of the share mode, and apply to the first electrode, a second pulse voltage in which a second holding voltage that is different from the first holding voltage and a second idle voltage that is different from the first idle voltage are alternated during a second period of the share mode.

In the receiving portion, a width of one end contacting the first electrode can be different from a width of the other end contacting the second electrode.

The suspended particles can be agglomerated in a direction where the width is wide in the receiving portion, by an electric field formed when a voltage is applied to the first electrode and the second electrode.

BRIEF DESCRIPTION OF THE DRAWINGS

The present disclosure will become more fully understood from the detailed description given hereinbelow and the accompanying drawings which are given by way of illustration only, and thus are not limitative of the present disclosure and wherein.

DETAILED DESCRIPTION OF THE EMBODIMENTS

Figure 1:
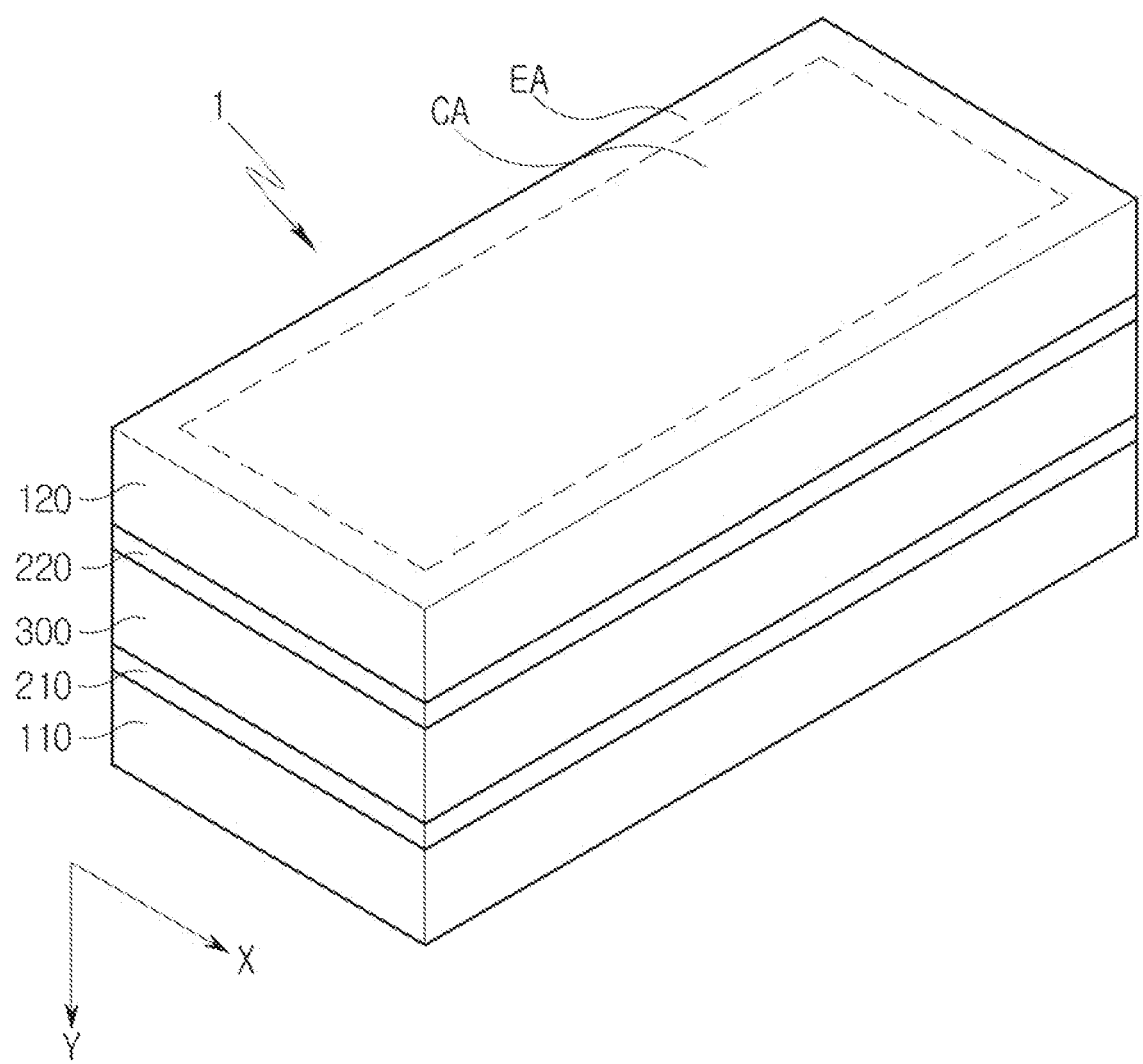
FIG. 1 is a schematic perspective view of an optical path control device according to an embodiment of the present disclosure.

Hereinafter, embodiments of the present disclosure will be described with reference to the accompanying drawings. Herein, when it is mentioned that a component (or an area, a layer, a part, etc.) is "on", "connected to", or "coupled to" another component, it can mean that the component can be directly connected/coupled to the other component or a third component can be disposed therebetween.

Like reference numerals refer to like components. Throughout the drawings, thicknesses, ratios, and dimensions of components are exaggerated for effective description of technical matters. "and/or" can include one or more combinations that can be defined by related components.

Terms such as first, second, etc., can be used to describe various components, but the components are not limited to those terms. These terms can be used for the purpose of distinguishing one component from another component. For example, a first element can be named as a second element without departing from the right scope described herein, and similarly, a second element can be named as a first element. Singular forms include plural forms unless apparently indicated otherwise contextually.

Terms such as "under", below", "on", "above", etc., are used to describe a relationship between components shown in the drawings. Those terms have relative concepts and are described based on a direction shown in the drawings.

Terms "include", "have", or the like are to indicate the presence of features, numbers, steps, operations, elements, parts, or a combination thereof described herein, and does not preclude the presence or addition of one or more other features, numbers, steps, operations, elements, parts, or a combination thereof.

Figure 2:
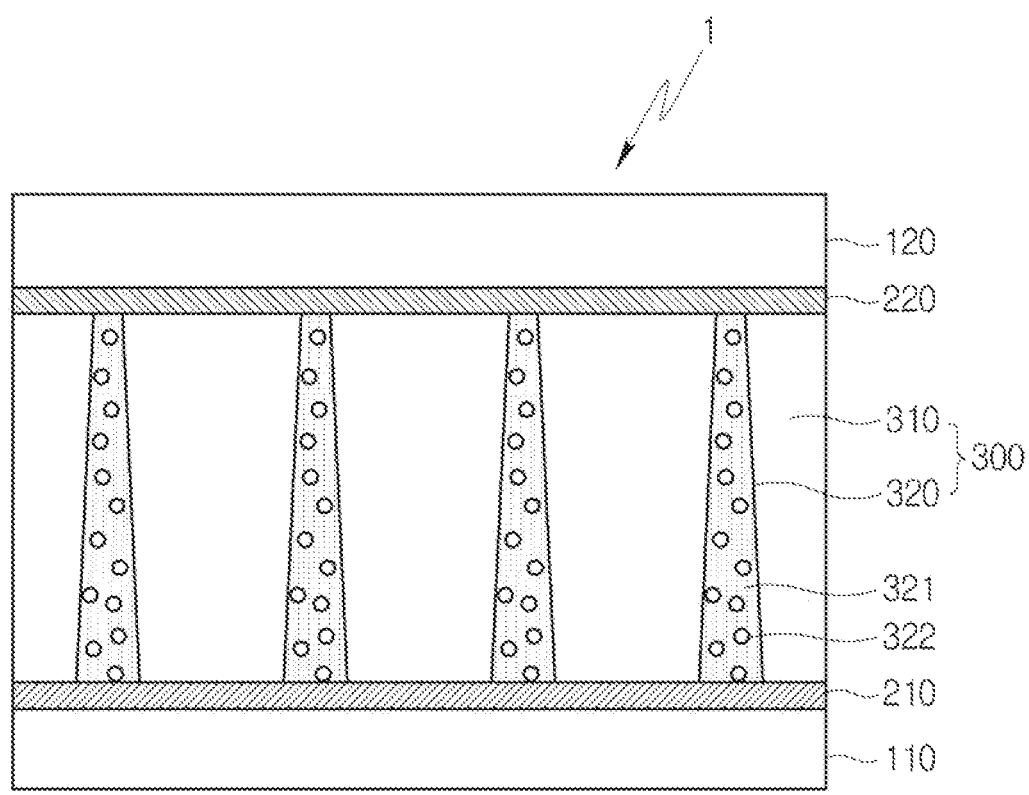
FIG. 2 is a schematic cross-sectional view of an optical path control device in a private mode.
Figure 3:
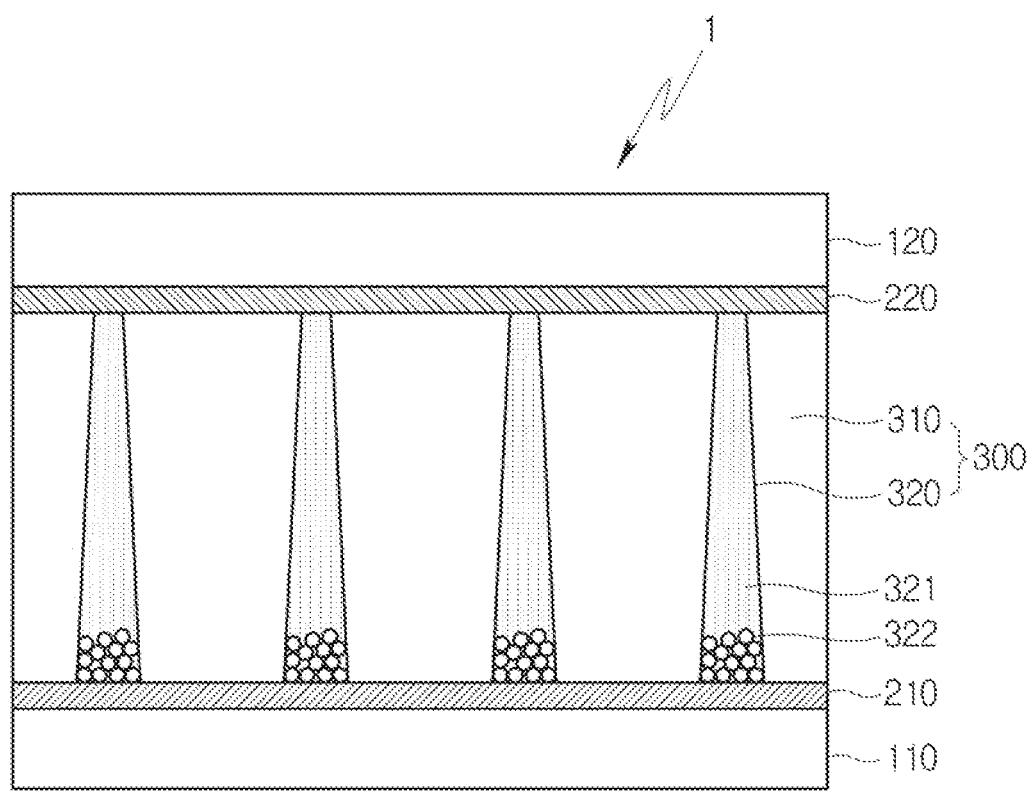
FIG. 3 is a schematic cross-sectional view of an optical path control device in a share mode.

FIG. 1 is a schematic perspective view of an optical path control device according to an embodiment of the present disclosure. FIG. 2 is a schematic cross-sectional view of an optical path control device in a private mode. FIG. 3 is a schematic cross-sectional view of an optical path control device in a share mode. More specifically, FIGS. 2 and 3 are cross-sectional views of an optical path control device cut along a first direction X. As an example, a share mode can be a mode in which the screen of a display device including the optical path control device is shared with multiple users or in a non-private manner, and a private mode can be a mode in which the screen is viewed exclusively in a private manner (e.g., maybe just the single user). For instance, multiple viewers can view contents being displayed on the screen in a share mode while an exclusive user/users can view contents being displayed on the screen in a private mode.

Referring to FIGS. 1 to 3, an optical path control device 1 can include a central area CA (e.g., middle or main area) and an edge area EA surrounding or adjacent to the central area CA. In the shown embodiment, the central area CA can have a globally rectangular form. However, the current embodiment is not limited thereto, and the central area CA can have various shapes such as a circular shape, an oval shape, a polygonal shape, etc. The edge area EA can be disposed to surround the central area CA, and an outer shape thereof can follow an overall shape of the optical path control device 1.

The optical path control device 1 can include a first substrate 110, second substrate 120, a first electrode 210, a second electrode 220, and a photoconversion layer 300.

The first substrate 110, which is a base material of the optical path control device 1, can be a light-transmitting substrate. The first substrate 110 can be a rigid substrate including glass or reinforced glass or a flexible substrate of a plastic material. For example, the first substrate 110, which is a flexible high-polymer film, can include any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), a triacetylcellulose (TAC) film, a polyvinyl alcohol (PVA) film, polyimide (PI), and polystyrene (PS). However, the material of the first substrate 110 is not limited thereto.

The first electrode 210 can be disposed on a surface (e.g., a top surface) of the first substrate 110. The first electrode 210 can be interposed between the first substrate 110 and the second substrate 120 described below. The first electrode 210 can be disposed in a surface electrode or pattern electrode form on the first substrate 110. A detailed structure of the first electrode 210 will be described in more detail below with reference to FIG. 5.

The first electrode 210 can include a transparent conductive material. For example, the first electrode 210 can be formed of indium tin oxide (ITO), indium zinc oxide (IZO), copper oxide, tin oxide, zinc oxide (ZnO), titanium oxide, etc. In an embodiment, a light transmittance of the first electrode 210 can be greater than or equal to about 80%. The first electrode 210 is invisible from the outside, and the light transmittance thereof can increase such that a luminance of the display device including the optical path control device 1 can be improved.

In another embodiment, the first electrode 210 can include various metals to implement low resistance. For example, the first electrode 210 can include at least one metal among chrome (Cr), nickel (Ni), copper (Cu), aluminum (Al), silver (Ag), molybdenum (Mo), gold (Au), titanium (Ti), and an alloy thereof.

The second substrate 120 can be disposed on the first substrate 110. The second substrate 120, which is a light-transmitting substrate, can include a material that is the same as or similar to that of the first substrate 110.

The second electrode 220 can be disposed on a surface (e.g., a bottom surface) of the second substrate 120. The second electrode 220 can be interposed between the first substrate 110 and the second substrate 120. The second electrode 220 can be disposed in the form of a surface electrode on the bottom surface of the second substrate 120.

The second electrode 220 can include a transparent conductive material and various metals for implementing low resistance. The second substrate 220 can include a material that is the same as or similar to that of the first substrate 210.

The second electrode 220 can be disposed to at least partially or entirely overlap or to at least adjoin the first electrode 210. Thus, when a voltage is applied to the first electrode 210 and the second electrode 220, an electric field can be formed therebetween.

The photoconversion layer 300 can be interposed between the first substrate 110 and the second substrate 120. The photoconversion layer 300 can include a partition portion 310 and a receiving portion 320. More specifically, the photoconversion layer 300 can include the receiving portion 320 partitioned into a plurality of areas by the partition portion 310.

In the photoconversion layer 300, the receiving portion 320 can extend long in the first direction X. For example, the receiving portion 320 can extend long from a central area of the first substrate 110 to an edge thereof.

The partition portion 310 and the receiving portion 320 in the photoconversion layer 300 can be disposed alternately in a second direction Y. In this case, the partition portion 310 and the receiving portion 320 can have widths that are the same as or different from each other in the second direction Y.

The partition portion 310 can include a transparent light-transmitting material. For example, the partition portion 310 can include ultra-violet (UV) resin or photoresist resin as photo-curable resin. Alternatively, the partition portion 310 can include urethane resin, acryl resin, etc. The partition portion 310 can pass light incident to the first substrate 110 or the second substrate 120 therethrough in an opposite direction.

The receiving portion 320 can have upper and lower widths that are the same as or different from each other. In the shown embodiment, the receiving portion 320 will be described in an example where the lower width adjacent to the first substrate 110 is greater than the upper width adjacent to the second substrate 120.

A surface of the receiving portion 320 can be disposed to overlap the first electrode 210. The other surface of the receiving portion 320 can be disposed to overlap the second electrode 220.

The receiving portion 320 can include dispersing liquid 321 and suspended particles 322 dispersed in the dispersing liquid 321. The dispersing liquid 321 is filled in the receiving portion 320, and the suspended particles 322 can be dispersed in the dispersing liquid 321.

The dispersing liquid 321, which is a solvent where the suspended particles 322 are dispersed, can be a transparent and low-viscosity insulating solvent. For example, the dispersing liquid 321 can include at least one material among halocarbon-based oil, paraffin-based oil, and isopropyl alcohol.

The suspended particles 322 can be colored electric behavior particles, e.g., black particles. The suspended particles 322 can be, but not limited to, carbon black particles. The receiving portion 320 can be electrically connected to the first electrode 210 and the second electrode 220, and the charged suspended particles 322 can be controlled in terms of an arrangement state thereof according to a voltage difference between the first electrode 210 and the second electrode 220. The photoconversion layer 300 can implement a light-transmitting mode and a light-blocking mode according to an arrangement state of the suspended particles 322.

More specifically, when a voltage is not applied to the first electrode 210 and the second electrode 220, the suspended particles 322 can be uniformly dispersed in the dispersing liquid 321 as shown in FIG. 2, thereby implementing the light-blocking mode where transmission of external light is blocked. In this case, the external light applied to the partition portion 310 can pass through the photoconversion layer 300, such that the external light is visible from the front of the optical path control device 1. For example, the optical path control device 1 can implement a private mode in which a field of view is opened for a particular viewing angle (e.g., a front viewing angle) and the field of view is blocked for another viewing angle (e.g., a side viewing angle).

When a voltage is applied to at least one of the first electrode 210 and the second electrode 220, as shown in FIG. 3, the suspended particles 322 can move toward the first electrode 210 or the second electrode 220 by an electric field as shown in FIG. 3. In this case, the moving direction of the suspended particles 322 can be controlled according to the polarity (a negative or positive polarity) of the suspended particles 322 and a relative magnitude of the voltage applied to the first electrode 210 and the second electrode 220.

When the suspended particles 322 are condensed around the first electrode 210 or the second electrode 220, the external light can pass through the partition portion 310 and the receiving portion 320, thus implementing a light-transmitting mode. For example, the optical path control device 1 can implement a share mode where the field of view is opened for both the front and the side.

In an embodiment, an adhesive layer can be further disposed between the photoconversion layer 300 and the first substrate 110 and/or the photoconversion layer 300 and the second substrate 120. For example, an adhesive layer can be interposed between the photoconversion layer 300 and the first electrode 210 and/or the photoconversion layer 300 and the second electrode 220. The adhesive layer can be formed on the first substrate 110 and the second substrate 120 to improve a coating property and an adhesive property, and can be, for example, a conductive primer. In such an embodiment, the conductive primer can include curable resin cured by energy such as heat, ultraviolet rays, electron rays, etc. The curable resin can be, for example, but not limited to, silicon resin, acryl resin, metacryl resin, epoxy resin, melamine resin, polyester resin, urethane resin, etc.

In an embodiment, a heating layer can be further disposed between the photoconversion layer 300 and the first substrate 110 and/or the photoconversion layer 300 and the second substrate 120. The heating layer can be a heating body that generates heat energy upon application of electricity thereto, and can include indium tin oxide (ITO), copper (Cu), silver (Ag), or nano wire (Ag/silver-nanowire). The heating layer can include a transparent light-transmitting material. The heat generated in the heating layer can be transferred to the photoconversion layer 300 to increase the activity of dispersing liquid 321 and the suspended particles 322 in the dispersing liquid 321. When the moving speed of the suspended particles 322 increases in this way, the speed of switching between the light-blocking mode and the light-transmitting mode can be improved. Moreover, as the temperature of the photoconversion layer 300 is appropriately maintained through the heating layer, an influence of the ambient temperature on the optical path control device 1 can be reduced and the operating temperature range of the optical path control device 1 can be enhanced.

Figure 4:
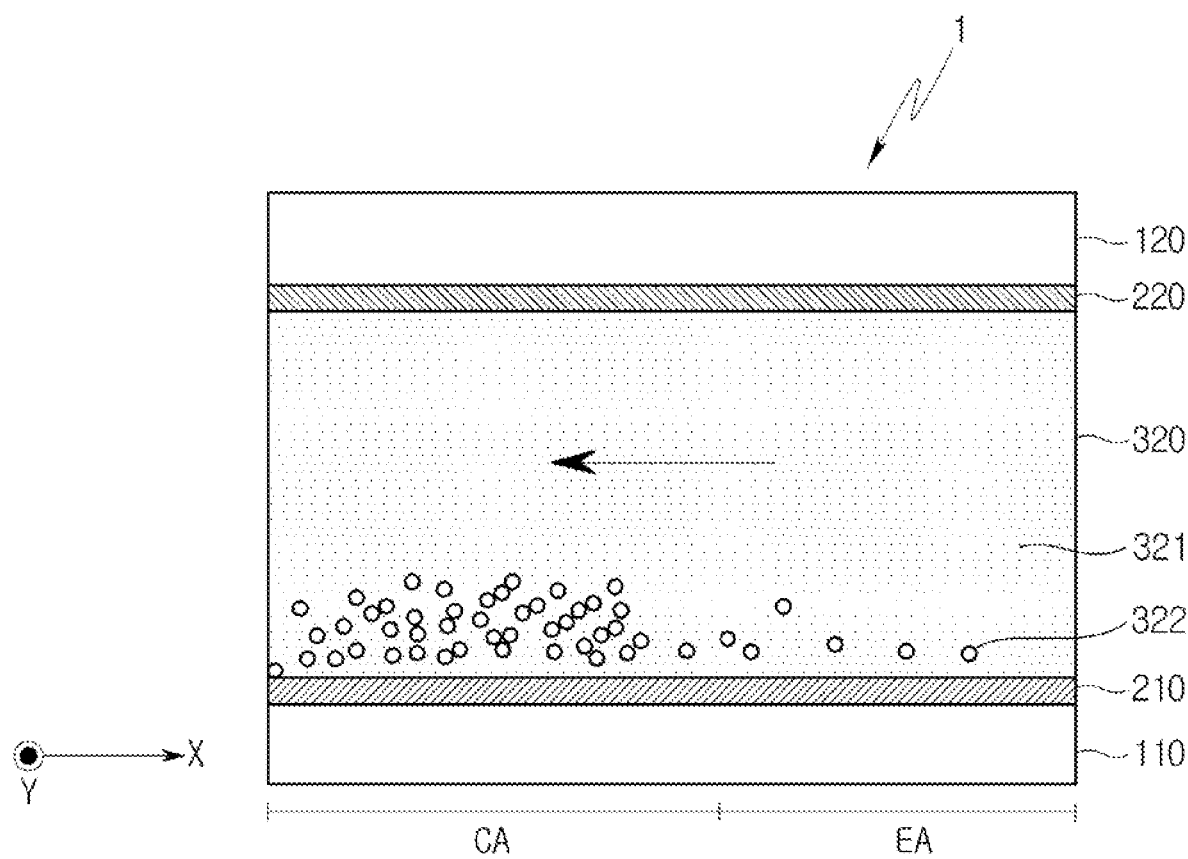
FIG. 4 is a view for describing electric field uniformity occurring in an optical path control device.

FIG. 4 is a view for describing electric field uniformity occurring in an optical path control device. More specifically, FIG. 4 is a cross-sectional view of an optical path control device cut along the second direction Y when the first electrode has a surface electrode form.

When the optical path control device 1 is used, a device internal temperature can increase due to application of the voltage. In this case, a heating value can differ with an area of the optical path control device 1. In general, the heating value is large in the central area CA of the optical path control device 1 and is small in the edge area EA.

Such temperature deviation can cause electric field deviation between areas of the optical path control device 1 in the share mode. For example, the resistance can increase in the edge area EA having low temperature, reducing the strength of the electric field. In this case, as shown in FIG. 4, the suspended particles 322 move from the edge area EA having a low strength of the electric field to the central area CA having a high strength of the electric field. Then, the density of the suspended particles 322 decreases in the edge area EA, failing to sufficiently block light transmission, and an edge bright line is visible to a user because a side viewing angle is partially opened.

Moreover, when the share mode operates for a long time, the suspended particles 322 can continuously receive electrical stress, resulting in agglomeration thereof and thus causing sparkling defects.

Hereinbelow, a detailed structure of the optical path control device 1 for solving or addressing the problems or limitations will be described.

Figure 5:
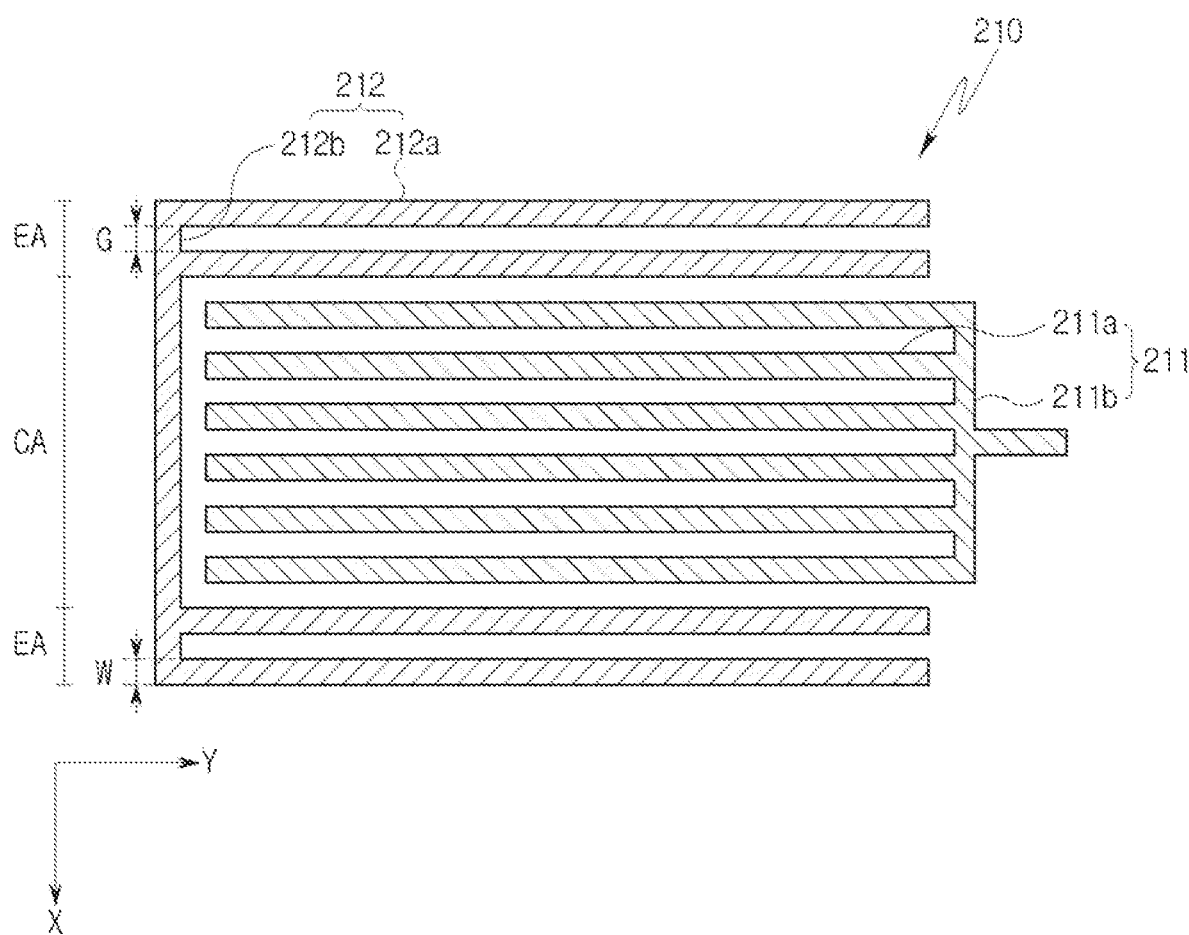
FIG. 5 is a view showing a first electrode of an optical path control device according to an embodiment of the present disclosure.

FIG. 5 is a view showing a first electrode of an optical path control device according to an embodiment of the present disclosure.

Referring to FIG. 5, a first electrode 210 can be disposed in the form of a pattern electrode having a specific pattern on the first substrate 110. For example, the first electrode 210 can include a first auxiliary electrode 211 and a second auxiliary electrode 212.

The first auxiliary electrode 211 can be disposed on a first area of the first substrate 110, and the second auxiliary electrode 212 can be disposed on a second area of the first substrate 110. In an embodiment, the first area can be the central area CA of the first substrate 110, and the second area can be at least a part of the edge area EA.

The auxiliary electrodes 211 and 212 can be patterned to respectively include extension portions 211a and 212a and connection portions 211b and 212b that connect the extension portions 211a and 212a. The first extension portions 211a of the first auxiliary electrode 211 can be spaced apart from each other in the first area, e.g., the central area CA, of the first substrate 110 to extend long in the second direction Y. The first connection portions 211b of the first auxiliary electrode 211 can extend in the first direction X to connect the first extension portions 211a to each other by being coupled to one ends of the first extension portions 211a.

The second extension portions 212a of the second auxiliary electrode 212 can be spaced apart from each other in the second area, e.g., the edge area EA, of the first substrate 110 to extend long in the second direction Y. For example, the second extension portions 212a can be disposed on an edge of a side and an edge of the other side of the first substrate 110. The second connection portions 212b of the second auxiliary electrode 212 can extend in the first direction X to connect the second extension portions 212a to each other by being coupled to one ends of the second extension portions 212a.

The first extension portions 211a and the second extension portions 212a can extend globally in parallel to one another. The first extension portions 211a and the second extension portions 212a can have widths W that are the same as or different from each other. For example, the second extension portions 212a can have widths W that are greater than those of the first extension portions 211a. Subsequently, an electrical resistance of the second extension portion 212a decreases, and thus a high-level voltage can be efficiently applied. When the widths W of the second extension portions 212a are greater than those of the first extension portions 211a, a higher voltage than that applied to the first extension portions 211a disposed in the central area CA can be applied to the second extension portions 212a disposed in the edge area EA, thus forming an electric field.

A gap G between adjacent first extension portions 211a, adjacent second extension portions 212a, and adjacent first extension portion 211a and second extension portion 212a can be properly selected to implement the light-transmitting mode and the light-blocking mode described below, while securing an aperture of the optical path control device 1.

The first auxiliary electrode 211 and the second auxiliary electrode 212 can be configured to receive different voltages. For example, the first auxiliary electrode 211 and the second auxiliary electrode 212 can be connected to different voltage sources.

Figure 6:
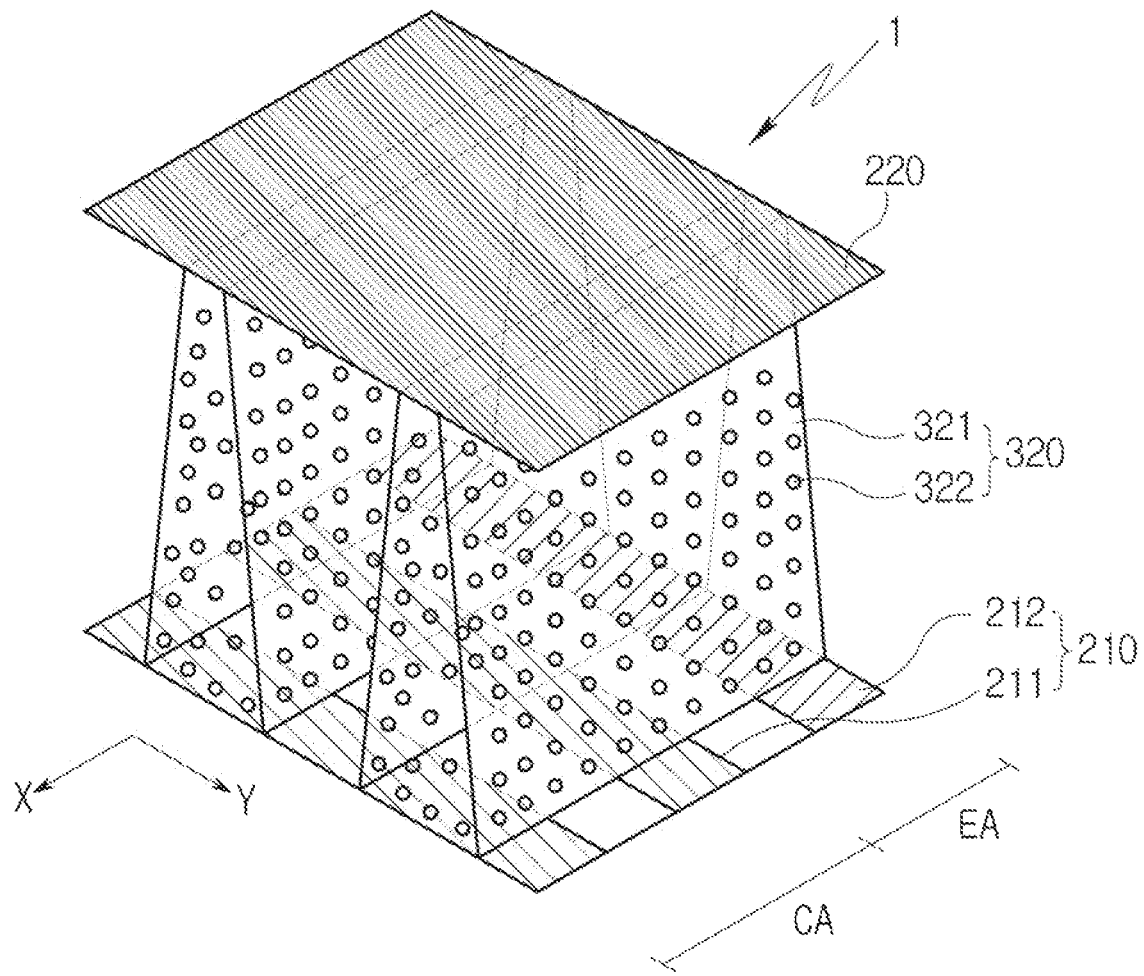
FIG. 6 is a schematic perspective view of an optical path control device according to an embodiment of the present disclosure in a private mode.
Figure 7:
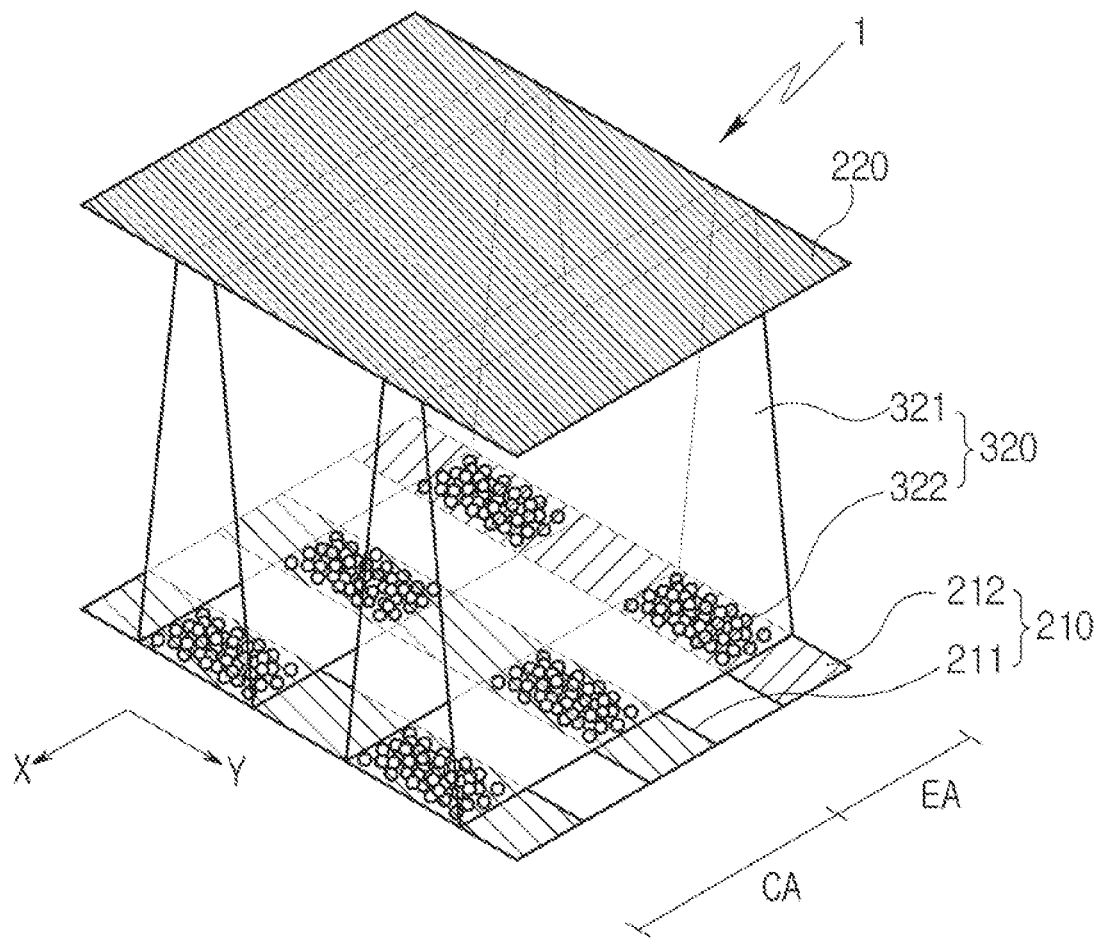
FIG. 7 is a schematic perspective view of an optical path control device according to an embodiment of the present disclosure in a share mode.
Figure 8:
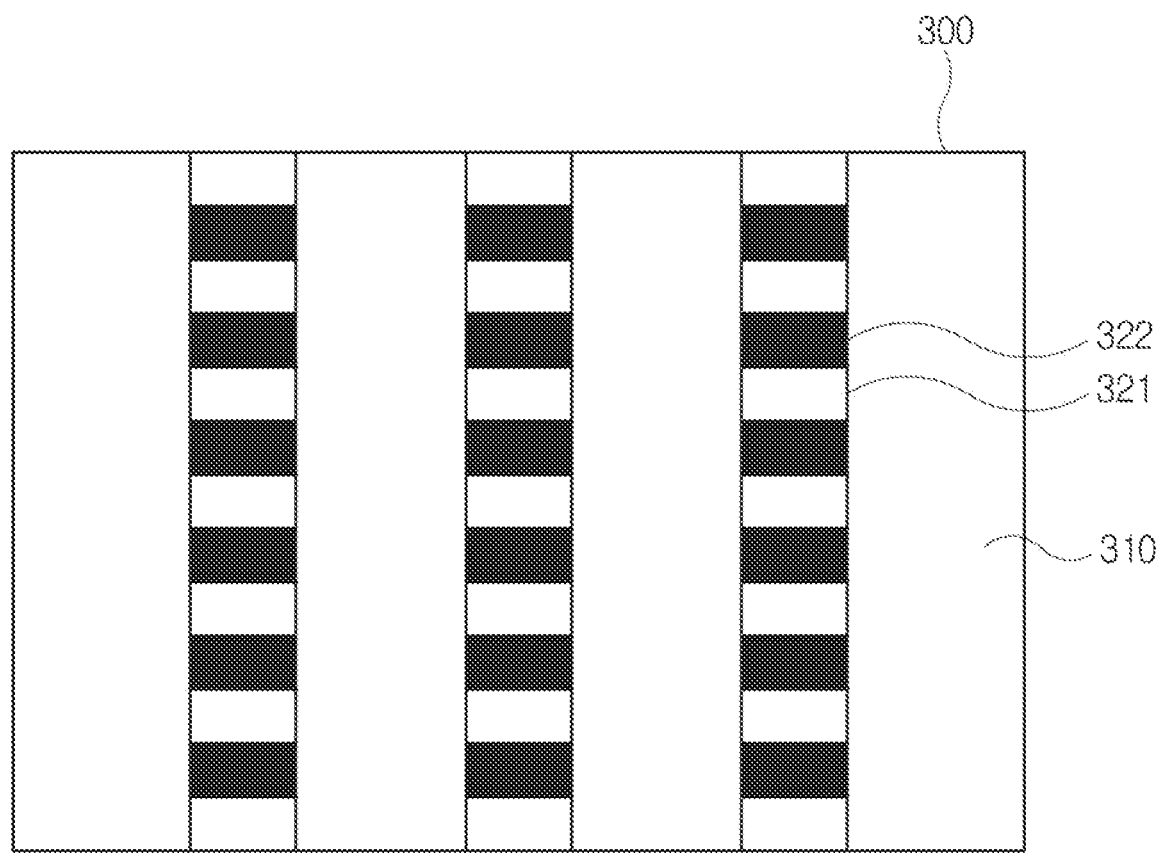
FIG. 8 is a plan view of another example of a photoconversion layer according to an embodiment of the present disclosure in a share mode.

FIG. 6 is a schematic perspective view of an optical path control device according to an embodiment of the present disclosure in a private mode. FIG. 7 is a schematic perspective view of an optical path control device according to an embodiment of the present disclosure in a share mode. FIG. 8 is a plan view of another examples of a photoconversion layer according to an embodiment of the present disclosure in a share mode.

Referring to FIGS. 6 and 7, the receiving portion 320 can be disposed such that at least an area thereof overlaps the first auxiliary electrode 211 and the second auxiliary electrode 212 of the first electrode 210. For example, a first area of the receiving portion 320 can overlap the first auxiliary electrode 211 and a second area of the receiving portion 320 can overlap the second auxiliary electrode 212. In an embodiment, the first area can be a central area of the receiving portion 320, and the second area can be an edge area, i.e., both ends. In addition, the receiving portion 320 can be disposed such that at least an area thereof overlaps the second electrode 220.

When a voltage is not applied to the first electrode 210 and the second electrode 220, the suspended particles 322 can be uniformly dispersed in the dispersing liquid 321 as shown in FIG. 6, thereby implementing the light-blocking mode where transmission of external light is blocked. For example, the optical path control device 1 can implement a private mode in which a field of view is opened for a particular viewing angle (e.g., a front viewing angle) and the field of view is blocked for another viewing angle (e.g., a side viewing angle).

When a voltage is applied to at least one of the first electrode 210 and the second electrode 220, as shown in FIG. 7, the suspended particles 322 can move toward the first electrode 210 or the second electrode 220 by an electric field as shown in FIG. 7. When the suspended particles 322 are condensed around the first electrode 210 or the second electrode 220, the external light can pass through the partition portion 310 and the receiving portion 320, thus implementing a light-transmitting mode. For example, the optical path control device 1 can implement a share mode where the field of view is opened for both the front and the side.

The moving direction of the suspended particles 322 can be controlled according to the polarity (a negative or positive polarity) of the suspended particles 322 and a relative magnitude of the voltage applied to the first electrode 210 and the second electrode 220. In the current embodiment, the suspended particles 322 can be controlled to move to a side where a width of the receiving portion 320 is relatively large. In the shown embodiment, the suspended particles 322 can be controlled to move to a lower end of the receiving portion 320.

To this end, a voltage of a polarity that is different from that of the suspended particles 322 can be applied to the first electrode 210. For example, when the suspended particles 322 are charged with negative polarity, a positive voltage can be applied to the first electrode 210.

When the suspended particles 322 are agglomerated, they are controlled to move to a large space of the receiving portion 320, thus minimizing an electrical stress applied to the suspended particles 322 and addressing an agglomeration phenomenon, in the long-term operation of the share mode.

In the current embodiment, the first electrode 210 can include the first auxiliary electrode 211 and the second auxiliary electrode 212 as described with reference to FIG. 5. To the second auxiliary electrode 212 disposed in the edge area EA, a voltage of a higher level than that of the first auxiliary electrode 211 can be applied.

When the electric field reduction phenomenon described with reference to FIG. 4 occurs, upon application of a higher voltage in the edge area EA, the strength of the electric field increases at both ends of the receiving portion 320, thereby preventing the electric field reduction phenomenon. Consequently, the electric field of a uniform magnitude can be applied to the entire area of the receiving portion 320, and the suspended particles 322 can be uniformly agglomerated within the receiving portion 320. As a result, spots and/or bright lines can be prevented from occurring due to the electric field deviation in the optical path control device 1.

As the first electrode 210 and the receiving portion 320 extend in a direction to intersect each other, the suspended particles 322 in one receiving portion 320 can be agglomerated in areas overlapping the first electrode 210. For example, the suspended particles 322 can be agglomerated in the form of a matrix as shown in FIG. 8. According to such an embodiment, an area through which light can pass between the suspended particles 322, and a transmittance can increase when compared to a case where the suspended particles 322 are agglomerated in the form of a stripe along the receiving portion 320. Then, the side aperture of the photoconversion layer 300 can be improved, and an angle of the side viewing angle can also be extended, thereby improving a luminance of a display device including the optical path control device 1.

In an embodiment, in the share mode, voltages applied to the first electrode 210 and the second electrode 220 can be maintained as a fixed value. Alternatively, in another embodiment, in the share mode, voltages applied to the first electrode 210 and the second electrode 220 can vary every preset period. Hereinbelow, an embodiment of the present disclosure where voltages applied to the first electrode 210 and the second electrode 220 are changed will be described in detail.

Figure 9:
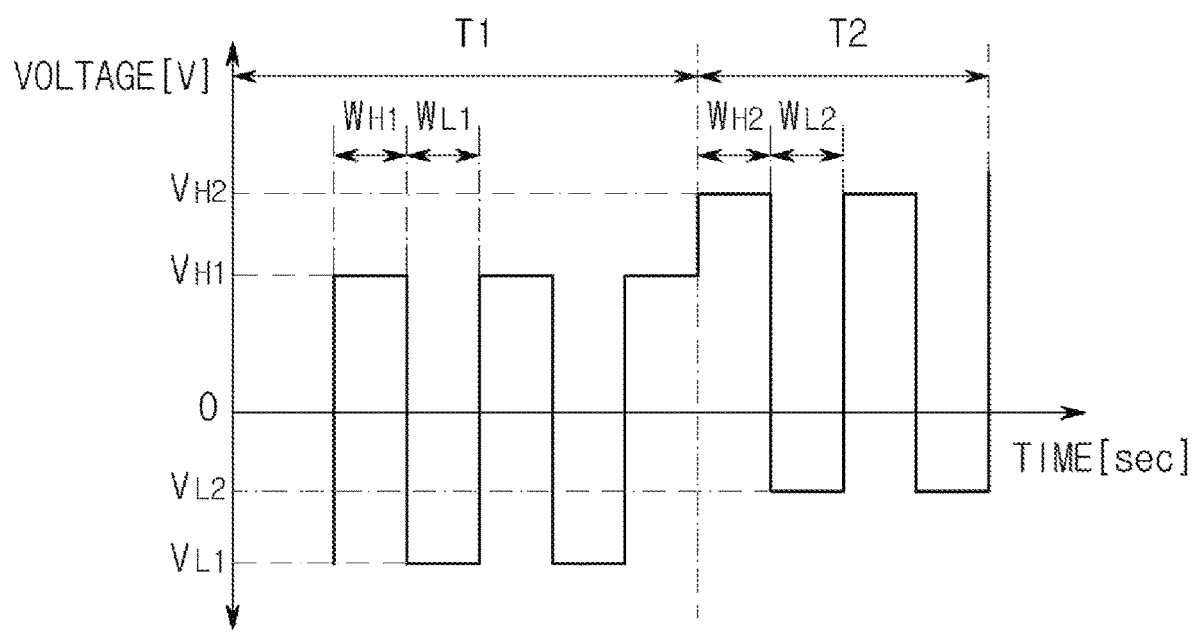
FIG. 9 is a timing diagram showing a waveform of a voltage applied to an optical path control device.
Figure 10:
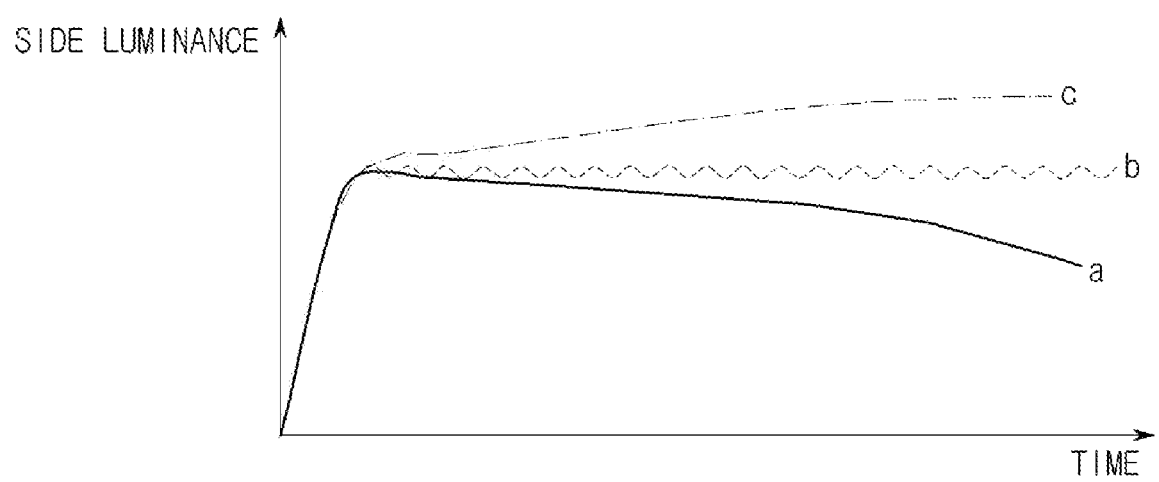
FIG. 10 is a timing diagram showing an edge luminance change over time.

FIG. 9 is a timing diagram showing a waveform of a voltage applied to an optical path control device. FIG. 10 is a timing diagram showing an edge luminance change over time.

In an embodiment, the optical path control device 1 can change the voltage applied to the first electrode 210 according to a preset period. The applied voltage can be a pulse voltage where a holding voltage and an idle voltage are alternated every preset pulse width.

More specifically, referring to FIG. 9, the optical path control device 1 can apply a pulse voltage to the first electrode 210. During a first period T1 of the share mode, the optical path control device 1 can apply a holding voltage $V_{H1}$ of a first level to the first electrode 210 during a first holding pulse width $W_{H1}$, and can apply an idle voltage VI1 of a second level to the first electrode 210 during a first idle pulse width Wu. The optical path control device 1 can alternately apply the holding voltage and the idle voltage during the first period T1.

During a second period T2 of the share mode, the optical path control device 1 can apply a holding voltage $V_{H2}$ of a third level to the first electrode 210 during a second holding pulse width $W_{H2}$, and can apply an idle voltage $V_{L2}$ of a fourth level to the first electrode 210 during a second idle pulse width $W_{L2}$. The optical path control device 1 can alternately apply the holding voltage and the idle voltage during the second period T2.

The holding voltage can be higher than the idle voltage. The holding voltage and the idle voltage can control a behavior of the suspended particles 322 to have a level of a sufficient magnitude capable of driving the share mode.

In an embodiment, when the holding voltage $V_{H1}$ is applied to the first electrode 210 for a long time, the strength of the electric field can decrease over time. Then, the behavior of the suspended particles 322 may not be sufficiently controlled such that the suspended particles 322 can be dispersed in the receiving portion 320. As a result, viewing angle limitation is not correctly performed in the share mode, and side luminance gradually degrades like a graph a of FIG. 10.

On the other hand, in an embodiment, when the holding voltage $V_{H2}$ of the third level is applied to the first electrode 210 for a long time, particle agglomeration can occur due to an electrical stress continuously applied to the suspended particles 322 and the side luminance can gradually increase due to sparkling as in a graph c of FIG. 10.

When the holding voltage is changed according to a preset period and the voltage in the pulse form is applied as in the current embodiment, the suspended particles 322 can be controlled to be correctly condensed without being dispersed or agglomerated. Thus, the side luminance can be maintained constant as in a graph b of FIG. 10.

Figure 11:
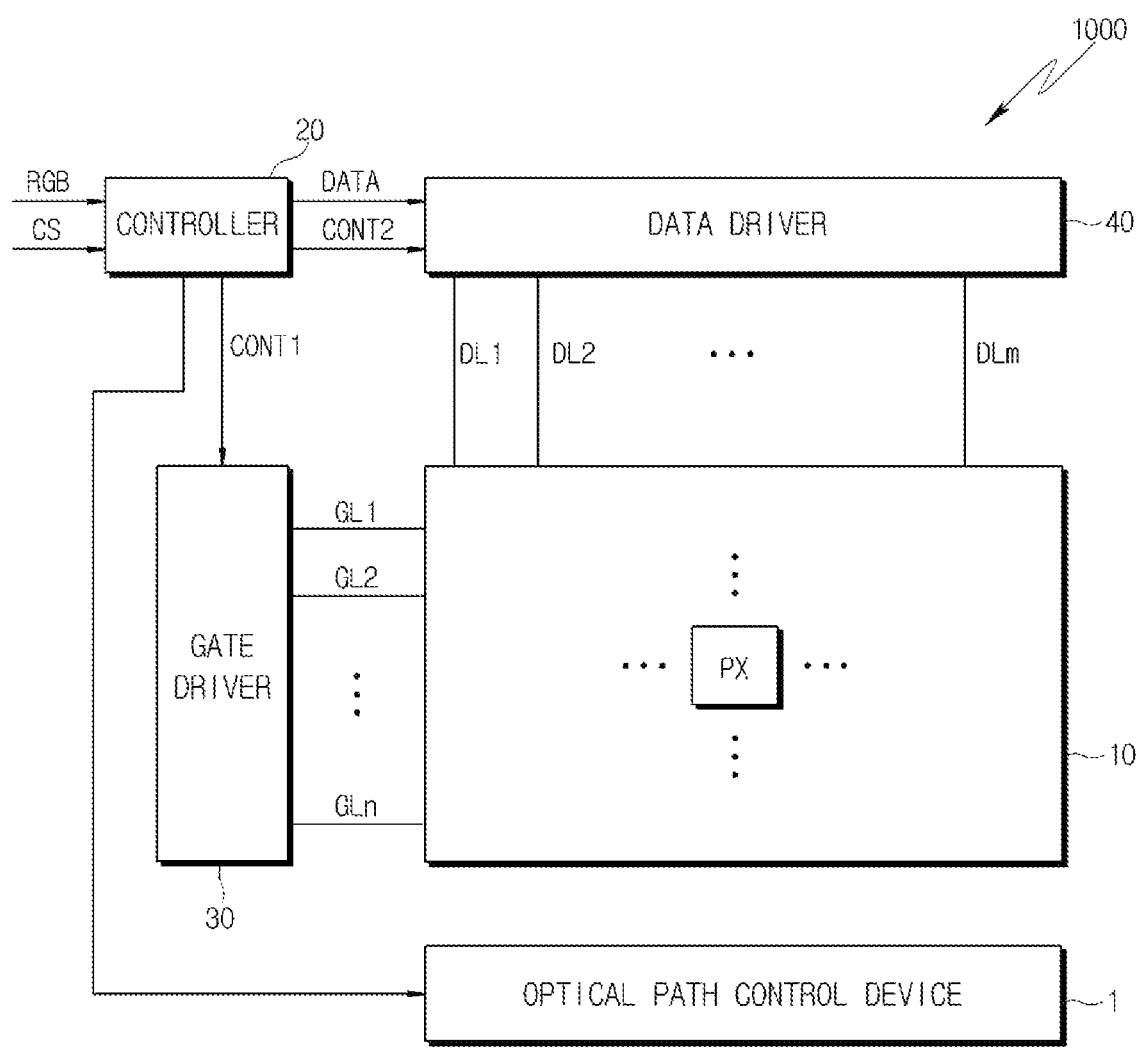
FIG. 11 is a block diagram of a display device according to an embodiment of the present disclosure.

FIG. 11 is a block diagram of a display device according to an embodiment of the present disclosure.

Referring to FIG. 11, a display device 1000 according to an embodiment can include a display panel 10, the optical path control device 1, a controller 20, a gate driver 30, and a data driver 40.

A plurality of pixels PX can be disposed on the display panel 10. The pixels PX can be arranged in the form of a matrix on the display panel 10, for example. The pixels PX can emit light with luminance corresponding to a gate signal and a data signal supplied through gate lines GL1 to GLn and data lines DL1 to DLm, where n and m can be positive numbers such as integers greater than 1. In an embodiment, each pixel PX can display any one color of red, green, blue, and white, but the current embodiment is not limited thereto.

The optical path control device 1 can be disposed on the display panel 10 to control the path of light emitted from the display panel 10. In an embodiment, the optical path control device 1 can be the optical path control device 1 described with reference to FIGS. 1 to 10.

The controller 20 can control the gate driver 30 and the data driver 40 to display an image on the display panel 10. For example, the controller 20 can receive an image signal RGB and a control signal CS from the outside. The image signal RGB can include a plurality of gray data. The control signal CS can include, for example, a horizontal synchronization signal, a vertical synchronization signal, and a clock signal.

In various embodiments of the present disclosure, the controller 20 may not or may apply a voltage to electrodes 210 and 220 of the optical path control device 1 as a display device 1000 is controlled in any one of the private mode and the share mode. For example, the controller 20 can apply a voltage to at least one of the first electrode 210 and the second electrode 220, and a waveform of the applied voltage can be a pulse waveform that is the same as described with reference to FIG. 9.

The controller 20 can process the image signal RGB and the control signal suitably for an operating condition of the display panel 10 to generate and output image data DATA, a gate driving control signal CONT1, and a data driving control signal CONT2.

The gate driver 30 can generate gate signals based on the gate driving control signal CONT1 output from the controller 20. The gate driver 30 can provide the generated gate signals to the pixels PX through a plurality of gate lines GL1 to GLn.

The data driver 40 can generate data signals based on the image data DATA and the data driving control signal CONT2 output from the controller 20. The data driver 40 can provide the generated data signals to the pixels PX through a plurality of data lines DL1 to DLm.

The optical path control device and the display device including the same according to embodiments of the present disclosure can address particle agglomeration occurring due to electrical stress continuously applied to particles and solve sparkling defects in long-term driving of the share mode.

Moreover, the optical path control device and the display device including the same according to embodiments of the present disclosure can solve a problem in which spots and/or bright lines are generated in a specific area, e.g., an edge, due to electric field deviation from area to area.

The optical path control device and the display device including the same according to embodiments of the present disclosure can improve an aperture through a patterned electrode.

According to an embodiment, an optical path control device comprises a first substrate, a first electrode disposed on the first substrate, a second substrate disposed on the first substrate, a second electrode disposed under the second substrate, and a photoconversion layer disposed between the first electrode and the second electrode, wherein a partition portion and a receiving portion comprising suspended particles are alternately arranged in the photoconversion layer.

The first electrode comprises a first auxiliary electrode disposed on a central area of the first substrate, where the first auxiliary electrode comprises a plurality of first extension portions spaced apart from each other in the central area to extend in a first direction, and a first connection portion connecting the first extension portions. The first electrode further comprises a second auxiliary electrode disposed on at least a part of an edge area of the first substrate, where the second auxiliary electrode comprises a plurality of second extension portions spaced apart from each other in the edge area to extend in the first direction, and a second connection portion connecting the second extension portions.

The receiving portion is disposed to extend in a second direction such that a central area thereof overlaps the plurality of first extension portions and both ends thereof overlap the plurality of second extension portions.

According to an embodiment, a display device comprises a display panel comprising pixels arranged therein and configured to display an image, a gate driver configured to apply a gate signal to the pixels, a data driver configured to apply a data signal to the pixels in synchronization with the gate signal, a controller configured to control the gate driver and the data driver to display the image on the display panel, and an optical path control device configured to control a path of light emitted from the display panel according to an operation mode. The optical path control device comprises a first substrate, a first electrode disposed on the first substrate, a second substrate disposed on the first substrate, a second electrode disposed under the second substrate, and a photoconversion layer disposed between the first electrode and the second electrode, wherein a partition portion and a receiving portion comprising suspended particles are alternately arranged in the photoconversion layer.

The first electrode comprises a first auxiliary electrode disposed on a central area of the first substrate, where the first auxiliary electrode comprises a plurality of first extension portions spaced apart from each other in the central area to extend in a first directions, and a first connection portion connecting the first extension portions. The first electrode further comprises a second auxiliary electrode disposed on at least a part of an edge area of the first substrate, where the second auxiliary electrode comprises a plurality of second extension portions spaced apart from each other in the edge area to extend in the first direction, and a second connection portion connecting the second extension portions The receiving portion is disposed to extend in a second direction such that a central area thereof overlaps the plurality of first extension portions and both ends thereof overlap the plurality of second extension portions.

While embodiments of the present disclosure have been described with reference to the attached drawings, it would be understood by those of ordinary skill in the art that the technical configuration of the present disclosure can be implemented in other detailed forms without changing the technical spirit or the essential features of the present disclosure. Thus, it should be noted that the above-described embodiments are provided as examples and should not be interpreted as limiting. Moreover, the scope of the present disclosure should be defined by the following claims rather than the detailed description provided above. Furthermore, the meanings and scope of the claims and all changes or modified forms derived from their equivalents should be construed as falling within the scope of the present disclosure.

What is claimed is:

1. An optical path control device comprising:
a first substrate;
a first electrode disposed on the first substrate;
a second substrate disposed on the first substrate;
a second electrode disposed under the second substrate; and
a photoconversion layer disposed between the first electrode and the second electrode, and comprising a partition portion and a receiving portion that are alternately arranged, the receiving portion comprising suspended particles,
wherein the first electrode comprises:
a first auxiliary electrode disposed on a first area of the first substrate; and
a second auxiliary electrode disposed on a second area of the first substrate,
wherein the first auxiliary electrode comprises:
a plurality of first extension portions spaced apart from each other in a central area of the first substrate to extend in a first direction; and
a first connection portion connecting the plurality of first extension portions, and wherein the second auxiliary electrode comprises:
a plurality of second extension portions spaced apart from each other in an edge area of the first substrate to extend in the first direction; and
a second connection portion connecting the plurality of second extension portions.

2. The optical path control device of claim 1, wherein the first area is the central area of the first substrate, and the second area is at least a part of the edge area of the first substrate.

3. The optical path control device of claim 1, wherein the receiving portion of the photoconversion layer is disposed so that a central area of the receiving portion overlaps the plurality of first extension portions and end areas of the receiving portion overlap the plurality of second extension portions.

4. The optical path control device of claim 1, wherein a width of one end of the receiving portion contacting the first electrode is different from a width of another end of the receiving portion contacting the second electrode.

5. The optical path control device of claim 4, wherein the suspended particles in the receiving portion are agglomerated in a direction where a width is wide in the receiving portion, by an electric field formed when a voltage is applied to the first electrode and the second electrode.

6. An optical path control device comprising:
a first substrate;
a first electrode disposed on the first substrate;
a second substrate disposed on the first substrate;
a second electrode disposed under the second substrate; and
a photoconversion layer disposed between the first electrode and the second electrode, and comprising a partition portion and a receiving portion that are alternately arranged, the receiving portion comprising suspended particles,
wherein the first electrode comprises:
a first auxiliary electrode disposed on a first area of the first substrate; and
a second auxiliary electrode disposed on a second area of the first substrate, and
wherein a voltage is not applied to the first electrode and the second electrode in a private mode, a voltage is applied to the first electrode and the second electrode in a share mode, and voltages of different levels are applied to the first auxiliary electrode and the second auxiliary electrode based on a mode of the optical path control device.

7. The optical path control device of claim 6, wherein a pulse voltage in which a holding voltage and an idle voltage are alternated every preset pulse width is applied to the first electrode during the share mode.

8. The optical path control device of claim 7, wherein the pulse voltage is set to alternate between a first holding voltage and a first idle voltage during a first period of the share mode, and to alternate between a second holding voltage that is different from the first holding voltage and a second idle voltage that is different from the first idle voltage during a second period of the share mode.

9. A display device comprising:
a display panel comprising pixels arranged therein and configured to display an image;
a gate driver configured to apply a gate signal to the pixels;
a data driver configured to apply a data signal to the pixels in synchronization with the gate signal;

a controller configured to control the gate driver and the data driver to display the image on the display panel; and an optical path control device configured to control a path of light emitted from the display panel according to an operation mode, wherein the optical path control device comprises:
a first substrate;
a first electrode disposed on the first substrate;
a second substrate disposed on the first substrate;
a second electrode disposed under the second substrate; and
a photoconversion layer disposed between the first electrode and the second electrode, and comprising a partition portion and a receiving portion that are alternately arranged, the receiving portion comprising suspended particles, wherein the first electrode comprises:
a first auxiliary electrode disposed on a first area of the first substrate; and
a second auxiliary electrode disposed on a second area of the first substrate, wherein the first auxiliary electrode comprises:
a plurality of first extension portions spaced apart from each other in a central area of the first substrate to extend in a first direction; and
a first connection portion connecting the plurality of first extension portions, and wherein the second auxiliary electrode comprises:
a plurality of second extension portions spaced apart from each other in an edge area of the first substrate to extend in the first direction; and
a second connection portion connecting the plurality of second extension portions.

10. The display device of claim 9, wherein the first area is a centralthe central area of the first substrate, and the second area is at least a part of the edge area of the first substrate.

11. The display device of claim 9, wherein the receiving portion of the photoconversion layer is disposed so that a central area of the receiving portion overlaps the plurality of first extension portions and end areas of the receiving portion overlap the plurality of second extension portions.

12. The display device of claim 9, wherein a width of one end of the receiving portion contacting the first electrode is different from a width of another end of the receiving portion contacting the second electrode.

13. The display device of claim 12, wherein the suspended particles in the receiving portion are agglomerated in a direction where a width is wide in the receiving portion, by an electric field formed when a voltage is applied to the first electrode and the second electrode.

14. A display device comprising:
a display panel comprising pixels arranged therein and configured to display an image;
a gate driver configured to apply a gate signal to the pixels;
a data driver configured to apply a data signal to the pixels in synchronization with the gate signal;
a controller configured to control the gate driver and the data driver to display the image on the display panel; and
an optical path control device configured to control a path of light emitted from the display panel according to an operation mode, wherein the optical path control device comprises:
a first substrate;
a first electrode disposed on the first substrate;
a second substrate disposed on the first substrate;
a second electrode disposed under the second substrate; and
a photoconversion layer disposed between the first electrode and the second electrode, and comprising a partition portion and a receiving portion that are alternately arranged, the receiving portion comprising suspended particles, wherein the first electrode comprises:
a first auxiliary electrode disposed on a first area of the first substrate; and
a second auxiliary electrode disposed on a second area of the first substrate, and wherein the controller does not apply a voltage to the first electrode and the second electrode in a private mode and applies a voltage to the first electrode and the second electrode in a share mode, and the controller applies voltages of different levels to the first auxiliary electrode and the second auxiliary electrode based on a mode of the optical path control device.

15. The display device of claim 14, wherein the controller applies to the first electrode, a pulse voltage in which a holding voltage and an idle voltage are alternated every preset pulse width during the share mode.

16. The display device of claim 15, wherein the controller applies to the first electrode, a first pulse voltage in which a first holding voltage and a first idle voltage are alternated during a first period of the share mode, and applies to the first electrode, a second pulse voltage in which a second holding voltage that is different from the first holding voltage and a second idle voltage that is different from the first idle voltage are alternated during a second period of the share mode.

* * * * *